(12) United States Patent
Wilson et al.

(10) Patent No.: US 8,521,625 B2
(45) Date of Patent: Aug. 27, 2013

(54) TAX REFUND SYSTEM

(75) Inventors: Robert D. Wilson, Shawnee, KS (US);
Mark A. Ernst, Mission Hills, KS (US)

(73) Assignee: H & R Block Tax Services LLC,
Kansas City, MO (US)

(*) Notice: Subject to any disclaimer, the term of this patent is extended or adjusted under 35 U.S.C. 154(b) by 18 days.

(21) Appl. No.: 12/844,414

(22) Filed: Jul. 27, 2010

(65) Prior Publication Data

US 2010/0293079 A1 Nov. 18, 2010

Related U.S. Application Data

(63) Continuation of application No. 11/626,677, filed on Jan. 24, 2007, now Pat. No. 7,765,132, which is a continuation of application No. 09/354,870, filed on Jul. 16, 1999, now Pat. No. 7,177,829.

(51) Int. Cl.
*G06F 17/22* (2006.01)
*G07F 19/00* (2006.01)
*G07B 17/00* (2006.01)

(52) U.S. Cl.
USPC ............................................. 705/31; 705/30

(58) Field of Classification Search
USPC ................................................... 705/30–31
See application file for complete search history.

(56) References Cited

U.S. PATENT DOCUMENTS

| | | | | |
|---|---|---|---|---|
| 5,025,372 A * | 6/1991 | Burton et al. | ............... | 705/14.17 |
| 5,193,057 A * | 3/1993 | Longfield | ........................ | 705/31 |
| 5,724,523 A * | 3/1998 | Longfield | ........................ | 705/35 |
| 5,787,404 A * | 7/1998 | Fernandez-Holmann | ...... | 705/35 |
| 5,878,405 A * | 3/1999 | Grant et al. | ..................... | 705/39 |
| 5,903,876 A * | 5/1999 | Hagemier | ........................ | 705/19 |
| 5,963,921 A * | 10/1999 | Longfield | ........................ | 705/31 |
| 6,003,016 A * | 12/1999 | Hagemier | ........................ | 705/19 |
| 6,185,683 B1 * | 2/2001 | Ginter et al. | .................. | 713/176 |
| 6,202,052 B1 * | 3/2001 | Miller | ............................. | 705/31 |
| 6,405,182 B1 * | 6/2002 | Cuervo | ............................ | 705/43 |
| 6,546,373 B1 * | 4/2003 | Cerra | .............................. | 705/19 |
| 7,117,172 B1 * | 10/2006 | Black | .............................. | 705/35 |
| 2002/0046110 A1 * | 4/2002 | Gallagher | ........................ | 705/14 |
| 2003/0167225 A1 * | 9/2003 | Adams | ............................ | 705/38 |
| 2004/0199422 A1 * | 10/2004 | Napier et al. | ................... | 705/14 |

* cited by examiner

Primary Examiner — Ig T An
(74) Attorney, Agent, or Firm — Standley Law Group LLP

(57) ABSTRACT

A tax refund system is disclosed in which in exchange for a taxpayer assigning all or a portion of his or her tax refund, a participating provider provides to the taxpayer a spending vehicle with buying power at participating outlets. Tax return data for an individual's tax return is processed by the IRS. A taxpayer consents to using a portion of the tax return data to acquire a spending vehicle from a financial institution of the taxpayer's choosing. Using a portion of the tax return data, the IRS arranges to electronically transfer an amount related to the taxpayer's refund to an account at the financial institution selected by the taxpayer. A taxpayer then receives a spending vehicle such as a credit, debit, or cash card, spending account, coupon, or rebate from a financial institution or other spending vehicle provider such as a retailer, service provider, wholesaler, distributor, or entertainment entity.

22 Claims, 4 Drawing Sheets

TAX REFUND SYSTEM

CROSS-REFERENCES TO RELATED APPLICATIONS

This application is a continuation of U.S. application Ser. No. 11/626,677 filed Jan. 24, 2007, now U.S. Pat. No. 7,765,132 issued Jul. 27, 2010, which is a continuation of U.S. application Ser. No. 09/354,870 filed Jul. 16, 1999, now U.S. Pat. No. 7,177,829 issued Feb. 13, 2007.

BACKGROUND AND SUMMARY OF THE INVENTION

The present invention relates generally to a system for distributing tax refunds to taxpayers and, more particularly, to a system for allocating some or all of a taxpayer's tax refund into a spending vehicle. Taxpayer tax returns may be prepared in a number of different ways. For example, since relatively recently, taxpayers have been able to file their tax returns electronically. For example, the United States Internal Revenue Service (IRS) has an electronic filing system for taxpayers to file their tax returns. The IRS has the capability to provide refunds to the taxpayer through electronic funds transfer from the United States Treasury. Electronic filing (as well as other forms of filing) may enable a taxpayer to receive a direct deposit of his or her refund into an account at a bank or other financial institution.

In a typical situation today, the taxpayer has a few options available for preparing his or her tax return. One method is by visiting a local tax preparer's office (such as an H & R Block local office) and having a tax preparer prepare the taxpayer's return and/or file the return electronically from the third party preparer's office. Another method available to taxpayers is preparing their tax returns through a software package commercially available (such as the Kiplinger Tax Cut® software package). By using a commercially available software package a taxpayer is assisted in preparing his or her own return and may be able to file the return electronically with the IRS. Other methods of preparing tax return forms include self-preparation, telefiling (i.e., by phone), and the newest method which is through the use of an internet site which can assist the taxpayer in the preparation and possible electronic filing of his or her tax returns. The present invention preferably takes advantage of electronic filings but may be used in association with any method of tax return preparation and filing. A taxpayer for purposes of this disclosure is a person or other entity that has paid or is paying taxes to a taxing authority, and who may be entitled to a portion of those taxes paid to be returned to the taxpayer.

With the system of the present invention, a taxpayer's tax refund may be paid by electronic funds transfer to a taxpayer's account. In exchange for the assignment of the deposit of the tax refund amount by the taxpayer, the third party assignee provides a spending vehicle to the taxpayer. For example, a taxpayer may assign his or her tax refund to a retailer and in exchange for the right to receive the taxpayer's deposited refund. The retailer provides the taxpayer a spending vehicle such as a credit card or debit card with a predetermined amount of spending power for use at various outlets. The retailer spending vehicle may include an amount of buying power greater than the amount of the taxpayer's tax refund amount. For example, a retailer may issue a special debit card worth $500 in exchange for receiving the taxpayer's deposited refund of $450. The benefit to the retailer is that the taxpayer must spend his or her tax refund dollars at the retailer's store(s), and the benefit to the taxpayer may be that the retailer offers buying power at the retailer's store(s) in excess of the dollar amount of the taxpayer's refund.

The present invention is directed to receiving a spending vehicle in exchange for assigning all or a portion of a taxpayer's deposited tax refund amount. The present invention is different from prior systems in which the taxpayer has received a refund check, direct deposit to a bank or other financial institution account, or access to a loan amount in anticipation of receiving a tax refund, the amount of which is assigned to the lending institution. Under the system of the present invention, the spending vehicle is preferably provided to the taxpayer once the third party spending vehicle provider obtains the taxpayer's deposited refund or upon receiving assurance that the refund amount is accurate and forthcoming. Under the prior loan systems the taxpayer was required to enter into a loan agreement with a lending institution. Due to regulatory banking laws, these loan agreements could be lengthy and cumbersome. Under the system of the present invention, loan agreements are not necessary.

The present invention will be described in greater detail hereinafter. The present invention is described in the form of preferred embodiments and is not to be limited to those preferred embodiments but instead shall be given the broadest scope of protection affordable under the law in view of the allowed claims.

DETAILED DESCRIPTION OF PREFERRED EMBODIMENT(S)

Figure 2:
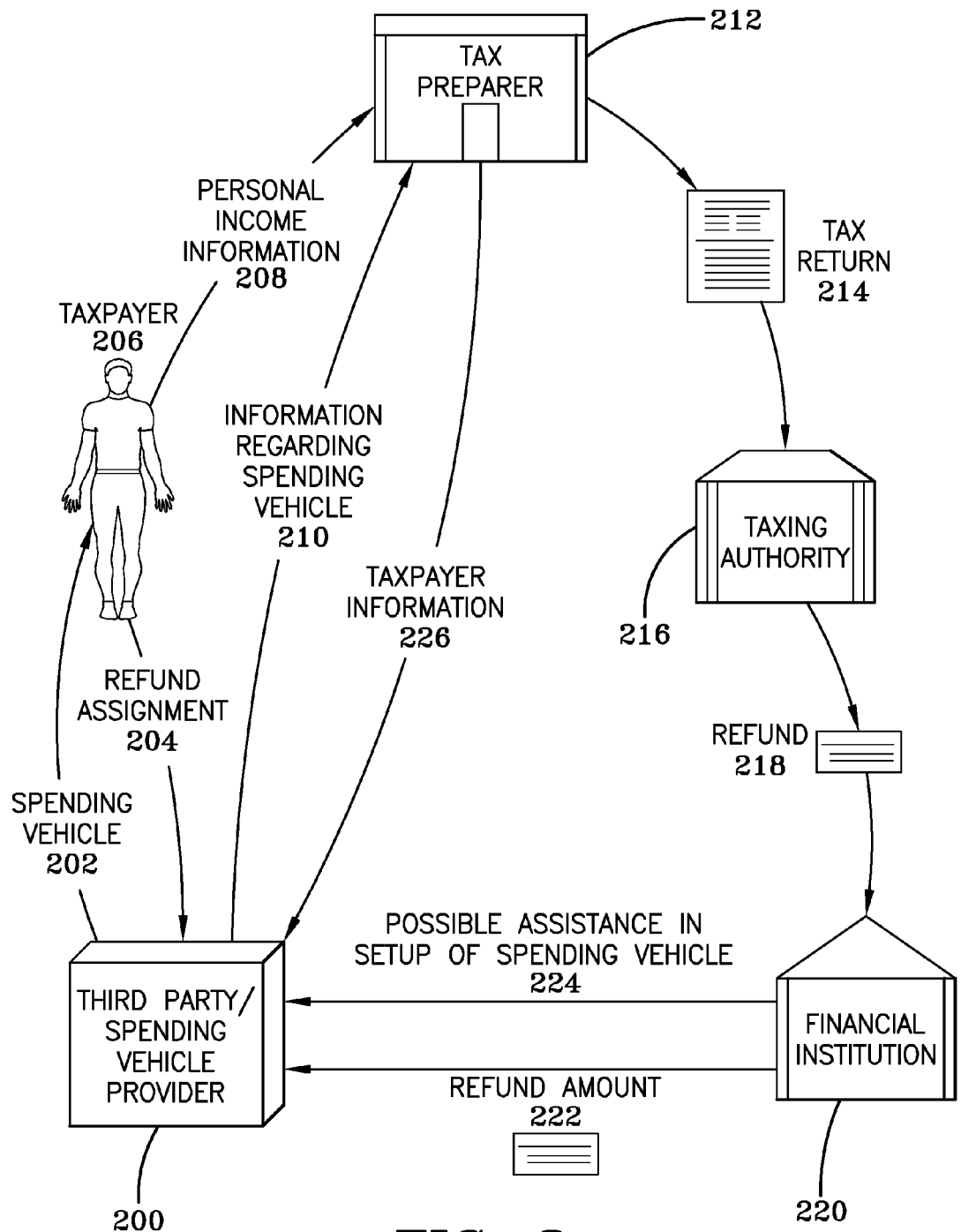
FIG. 2 is a schematic view of a preferred embodiment of the system of the present invention.

Referring now to the drawings, there is shown in FIG. 2 a preferred embodiment of the system of the present invention. The present invention is described with reference to the United States federal tax system and the IRS. However, the present invention has applicability to practically any tax system at the federal, state or local level in practically any country with a taxing authority.

Figure 1:
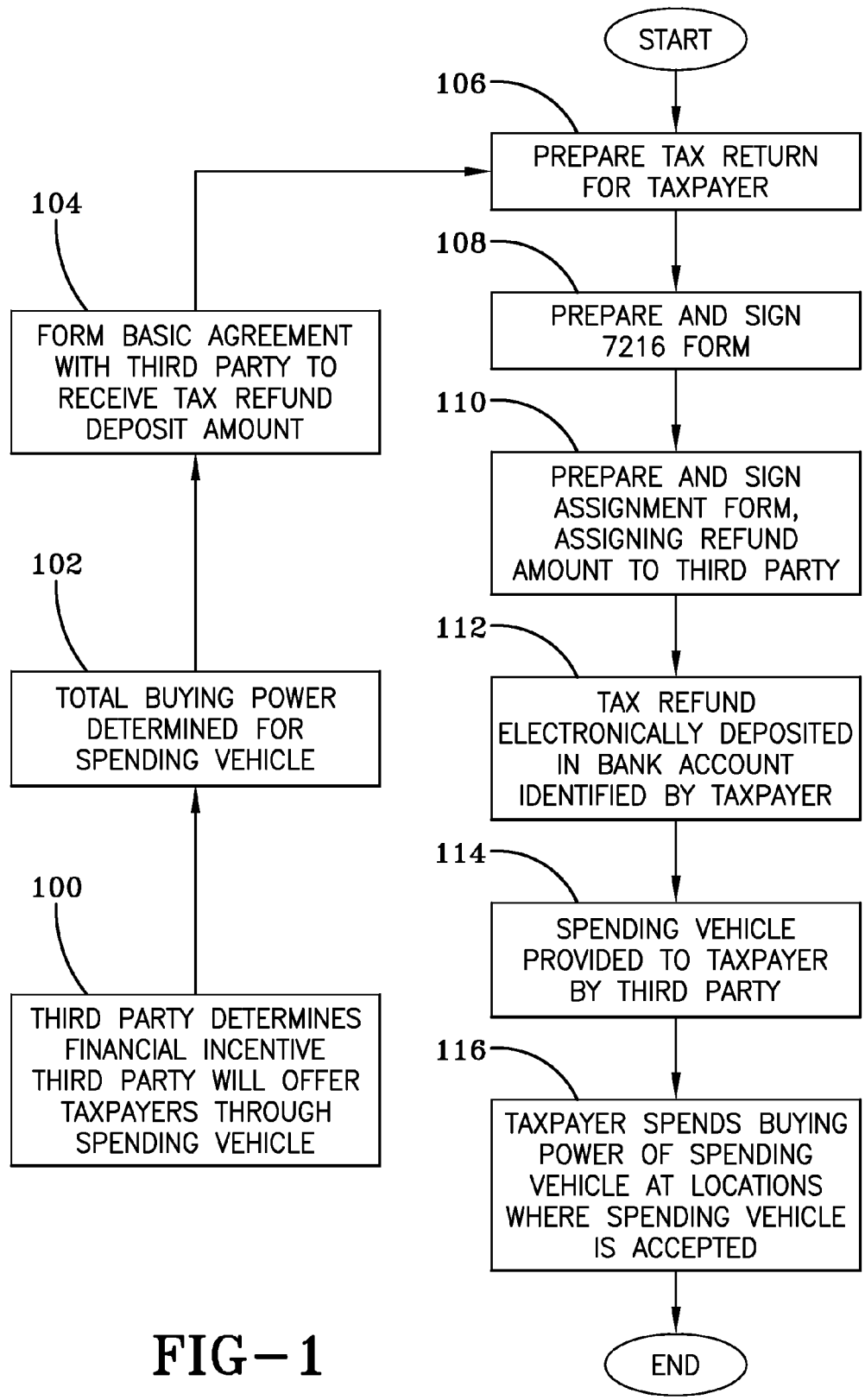
FIG. 1 is a flow diagram of a preferred embodiment of the present invention.

Steps to accomplish a preferred embodiment of the present invention are shown in FIG. 1. A third party determines a financial incentive it will offer to taxpayers through a spending vehicle 100. Next, the third party determines the total buying power for the spending vehicle 102. A basic agreement that allows the third party to receive a tax refund is created 104. A tax return is then prepared for the taxpayer 106. The taxpayer may prepare his or her own tax return or have it prepared by a third party preparer. The taxpayer signs a 7216 Form to allow the information on his or her tax return to be used by other parties 108. An assignment form is also signed so that the tax refund amount is assigned to the third party 110. The tax return is processed and the tax refund is electronically deposited in a bank account identified by the taxpayer 112. The spending vehicle is provided to the taxpayer by the third party 114. The taxpayer then spends the buying power of the spending vehicle at locations where it is accepted 116.

Referring to FIG. 2, a schematic view of a preferred embodiment of the system of the present invention is shown.

A taxpayer 206 prepares his or her own tax return or has his or her tax return prepared by a third party preparer 212. Preparation of the tax return may be done in practically any way and still accomplish the present invention. Usually, tax returns are prepared manually or electronically. While having his or her tax return prepared the taxpayer 206 may be asked whether he or she wishes to benefit from receipt of a spending vehicle 202 in exchange for assigning the amount of his or her tax refund amount 204 to another party 200. If the taxpayer 206 desires to receive the spending vehicle 202, then the taxpayer 206 may execute an assignment form 204 in which all or a portion of the tax refund amount paid to the taxpayer 206 is assigned to a third party 200 in exchange for the third party 200 agreeing to provide the taxpayer 206 with a spending vehicle 202. The taxpayer 206 may sign an IRC Section 7216 consent form or other consent to allow the information on his or her tax return 208 to be used by the tax preparation company 212 and/or the third party assignee of the tax refund deposit 200, to disclose information about the taxpayer 206 for completing the issuance of the spending vehicle 210.

In a preferred embodiment, once the tax returns 214 are completed for the taxpayer 206, they are filed electronically with the IRS 216. Certain information in the tax returns 226 is electronically provided to a financial institution 220 to assist in providing the spending vehicle to the taxpayer 224. Such information may include, but is not limited to, the taxpayer's name and address, social security number, as well as the tax refund amount claimed 222. Once the IRS 216 processes the taxpayer's tax return, the IRS 216 may send the refund amount 218 to the taxpayer's account at a financial institution 220 designated by the taxpayer 206 or at an agent 200 designated by the taxpayer 206 who provides the taxpayer 206 with a financial value through a financial vehicle 202 such as a credit card, debit card, e-wallet account, gift card, or any other type of spending vehicle which would enable the holder of the spending vehicle to purchase products or services.

In another embodiment of the present invention the IRS may provide its own spending vehicle to the taxpayer. In other words, the IRS may provide a spending vehicle to the taxpayer directly without need of an intermediate entity such as a financial institution. Likewise, the tax preparer company may not be necessary to make effective use of the present invention. For example, a taxpayer may file his or her own tax returns either by mail or electronically through the internet, for example, and, while doing so, execute an assignment of his or her tax refund payment to a third party who would in turn provide a spending vehicle to the taxpayer.

Under a preferred embodiment of the present invention, the spending vehicle provider may issue, for example, a debit card to a taxpayer upon receiving confirmation of the taxpayer's refund amount. The credit card or debit card may not be activated until such time as the spending vehicle provider receives the tax refund deposit amount. The spending vehicle may include a telephone number for a taxpayer to call to activate the spending vehicle once the spending vehicle provider is assured of receipt of the tax refund amount. Once the taxpayer's spending vehicle is activated, the taxpayer may spend the value of the spending vehicle. For example, a taxpayer who is entitled to receive a $450 tax refund amount may assign that amount to a spending vehicle provider in exchange for $500 of spending power through a debit card good only at a particular retailer or at some group of retailers. In another example, a taxpayer who is due a refund amount of $2,500 may assign his or her refund amount to an automobile dealer in exchange for the automobile dealer issuing a spending vehicle worth $3,000 in buying power at the auto dealership.

In another example, a cruise line may offer a spending vehicle of $3,000 in exchange for receiving the taxpayer's refund amount of $2,250.

The spending vehicle may take the form of many different embodiments, including but not limited to, credit cards, debit cards, cash cards, spending accounts, electronic spending accounts, coupons, discount certificates, rebate certificates, and any other vehicle in which a taxpayer receives spending power in a particular dollar amount useable at practically any participating retailer, financial institution, service provider, wholesaler, distributor, manufacturer, entertainment entity, and any participating entity through which a taxpayer may purchase something of value to the taxpayer. A tax return may be any means by which tax information is gathered. For example, and not by limitation, a paper form may be used, or an electronic form may be used, or a form per se (as may be defined as a predetermined list of questions to be responded to) may not be needed, rather a collection of tax information accomplished in any manner is all the data collection that is necessary to invoke the present invention. Another example of an acceptable collection of information (i.e., tax return) is collecting the information telephonically by the taxpayer calling a particular telephone number and speaking answers (or answering by pushing buttons on a touch-tone phone) to questions posed by a live operator or posed by an automated interactive voice response (IVR) system.

Figure 3:
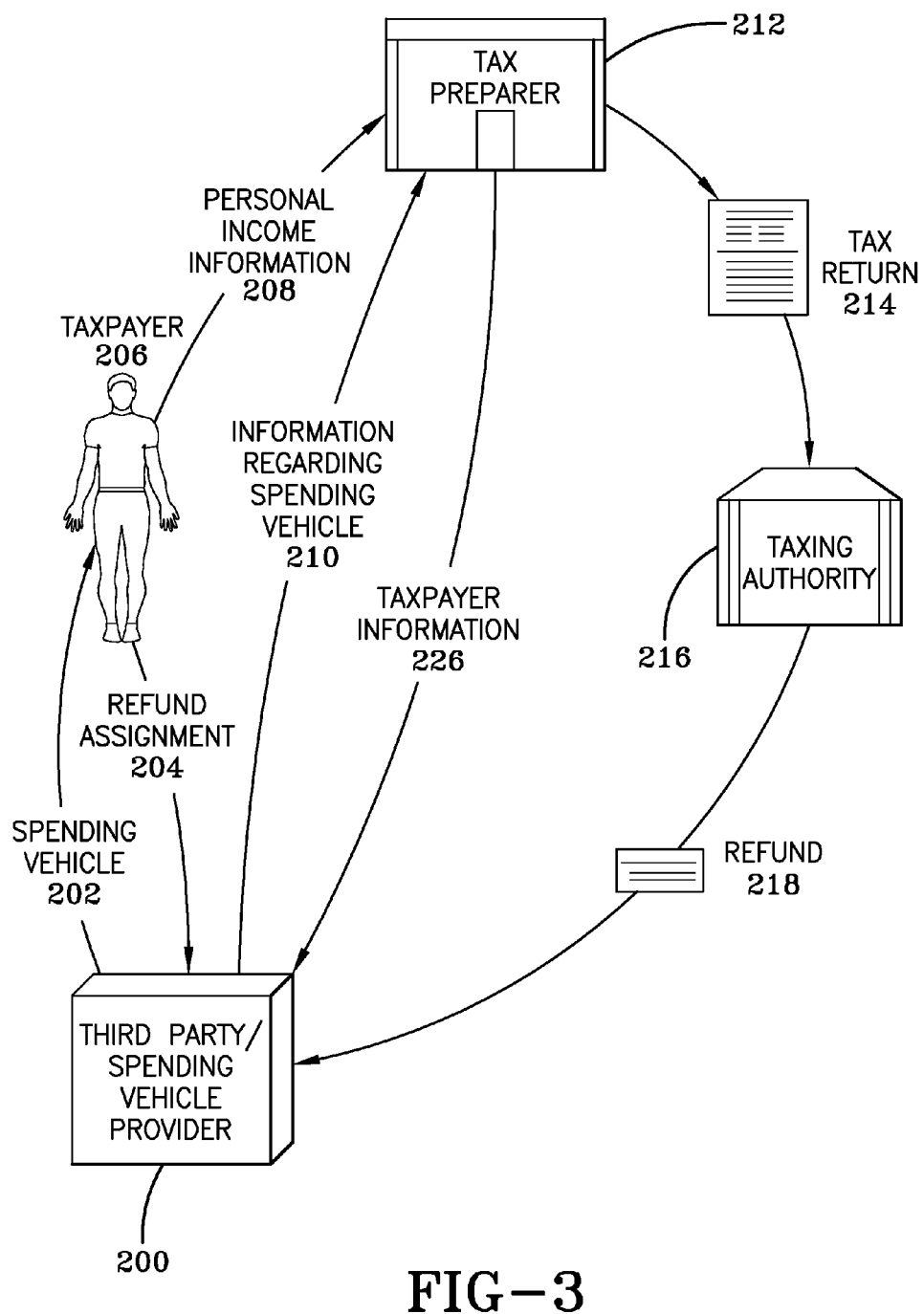
FIG. 3 is a schematic view of another preferred embodiment of the system of the present invention; and, FIG. 4 is a schematic view of yet another preferred embodiment of the system of the present invention.
Figure 4:
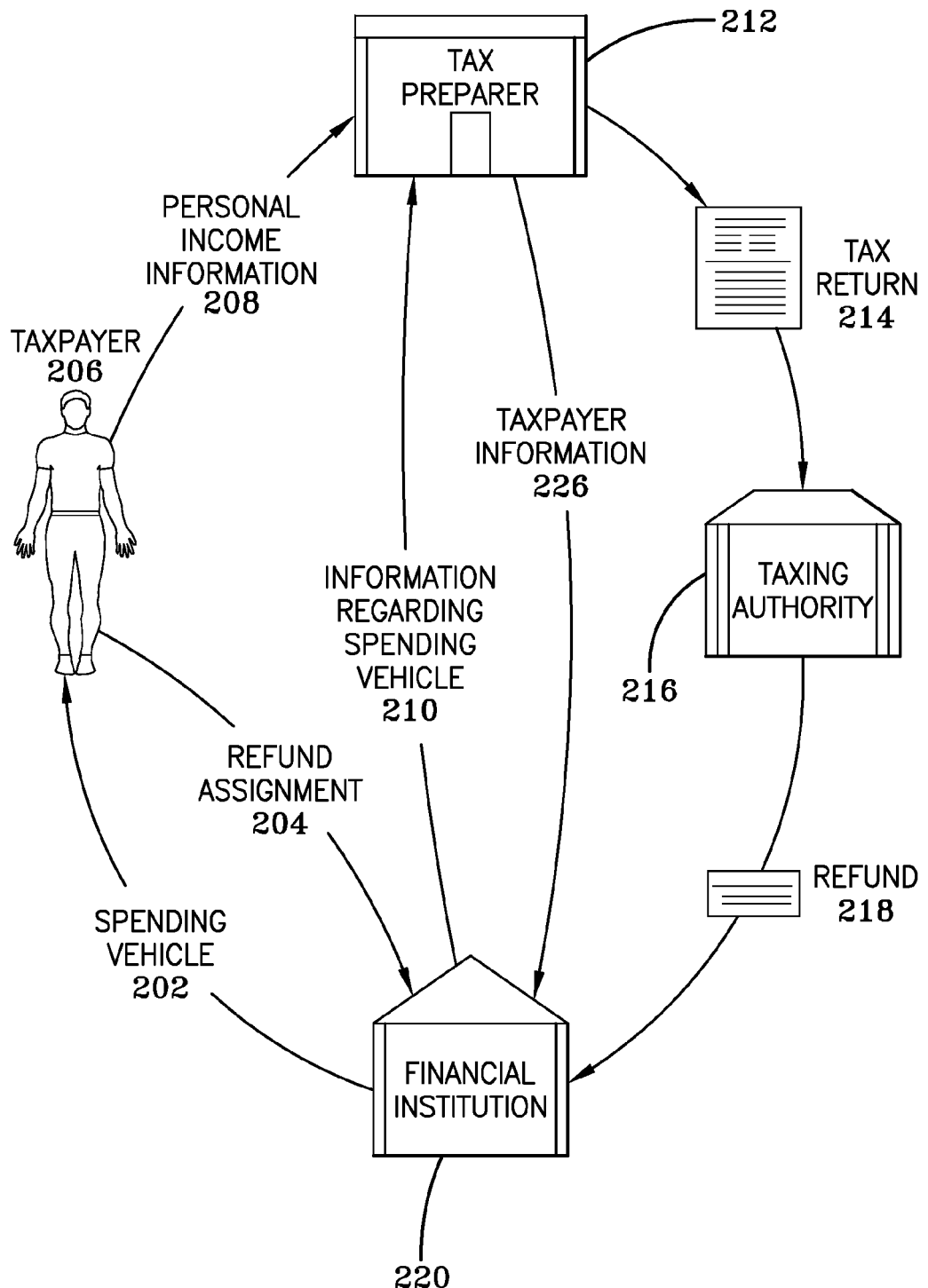

Use of a financial institution as a middleman between the taxpayer, the IRS, and the spending vehicle provider may be preferable. For example, financial institutions are typically well established in providing spending vehicles such as credit cards and debit cards. A retailer, for example, may find it helpful to provide its own spending vehicle if done in conjunction with a financial institution. While financial institutions may be beneficial to the process of the present invention, they are not essential. Since the IRS may send tax refund amounts to a bank account established by or for the taxpayer, a spending vehicle provider may find it advantageous to work through that financial account rather than attempt to receive the tax refund amount through other avenues. FIG. 3 shows another embodiment of the present invention in which a financial institution is not involved in issuing a spending vehicle, rather a retailer 200, for example, prepares its own spending vehicle 202. FIG. 4 shows another embodiment of the present invention in which a particular third party spending vehicle provider is not necessary, rather a financial institution 220 (perhaps the bank where the taxpayer banks), for example, issues a spending vehicle 202 directly to the taxpayer 206 that may be used at many different outlets for the purchase of goods and or services.

Once the taxpayer receives the spending vehicle and the spending vehicle has been activated, the taxpayer may spend the dollar amount of value inherent in that taxpayer's spending vehicle through participating sales outlets. Furthermore, the spending vehicle provider may agree to assign its rights and obligations in the spending vehicle to another entity at which the taxpayer may spend or obtain the unspent dollar amount of the spending vehicle.

A tax preparation company may also benefit from the present invention in a number of different ways. In a preferred embodiment of the present invention the tax preparation company may receive a small percentage of the dollar amount of sales generated by the spending vehicle. The tax preparation company may also benefit by extra business in tax preparation from taxpayers interested in receiving the benefits of the present invention. In another embodiment of the present invention the tax preparation company may receive a participation fee from goods and services providers who desire to be a part of the system of the present invention.

The tax preparation and/or electronic tax filing fee charged by a tax preparation company may be paid through an assignment of a portion of the refund amount by the taxpayer. For example, in a situation where a taxpayer is due a $1,000 refund, a portion of that amount may be allocated to the tax preparation company for preparing the tax returns and filing them, and the remaining portion of the account may be directed to a spending vehicle provider for providing a spending vehicle to the taxpayer. Alternatively, the taxpayer may pay the tax preparation company directly at the time of the preparation and/or electronic tax filing of the tax return forms.

Once the spending vehicle is activated for the taxpayer, in a preferred embodiment of the present invention, the taxpayer may be given a period of time in which to use the spending vehicle before a service charge is applied. For example, the taxpayer may incur no service charge on the spending vehicle if the spending vehicle is used within 90 days of being activated. In the event a minimum balance remains in the spending vehicle after the initial "no fee" period, a small monthly service charge may be levied against the spending vehicle until it is entirely used. Alternatively, after a period of time (e.g., 60 days) the spending vehicle provider may issue a check to the taxpayer for the balance left in the spending vehicle.

Having shown and described a preferred embodiment of the present invention, those skilled in the art will realize that many variations and modifications may be made to the described invention and still be within the scope of the claimed invention. Thus many of the elements indicated above may be altered or replaced by different elements which will provide the same or substantially the same result and fall within the spirit of the claimed invention. It is the intention therefore to limit the invention only as indicated by the scope of the claims.

The invention claimed is:

1. A computerized method for providing a tax refund to a taxpayer comprising:
   (a) receiving at a computer a tax refund amount for a taxpayer;
   (b) offering said taxpayer an option of receiving at least a portion of said tax refund amount on a spending vehicle with a value greater than said at least said portion of said tax refund amount, said spending vehicle provided by a financial institution that agrees:
      (1) to accept an assignment of right entitling said financial institution to retain said at least a portion of said tax refund amount; and
      (2) to issue said spending vehicle to said taxpayer in exchange only for said assignment of right; and
   (c) receiving from said taxpayer an assignment of right allocating said at least a portion of said tax refund amount to said financial institution; and
   (d) transmitting electronically from said computer to a financial institution computer taxpayer information to assist said financial institution in
      (1) allocating said at least said portion of said tax refund to said spending vehicle; and
      (2) issuing to said taxpayer said spending vehicle in an amount greater than said allocated portion.

2. The computerized method of claim 1 further comprising preparing a tax return for said taxpayer.

3. The computerized method of claim 2 wherein said tax return is prepared by a third party preparer.

4. The computerized method of claim 2 further comprising filing said tax return with a taxing authority.

5. The computerized method of claim 4 further comprising receiving at said computer from said taxing authority assurance that said tax refund amount is forthcoming.

6. The computerized method of claim 4 further comprising receiving from said taxing authority said taxpayer's tax refund.

7. The computerized method of claim 6 further comprising deducting tax return preparation fees from said tax refund when said tax refund is received from said taxing authority.

8. The computerized method of claim 1 wherein said spending vehicle is selected from the group consisting of a debit card, a cash card, a gift card, an e-wallet account, a spending account, a coupon, a discount certificate, and rebate certificate.

9. A computerized system for providing a tax refund to a taxpayer comprising:
   (a) a computer for:
      (1) receiving tax return data, said tax return data comprising a tax refund amount for said taxpayer;
      (2) receiving said taxpayer's selection of an option to receive at least a portion of said tax refund amount on a spending vehicle with a value greater than said at least said portion of said tax refund amount provided by a financial institution that agrees to accept only an assignment of rights allocating said at least a portion of said tax refund to said financial institution;
   (b) an assignment of rights from said taxpayer allocating at least a portion of said tax refund amount to said financial institution and entitling said financial institution to receive said portion of said tax refund amount;
   (c) a financial institution computer for receiving from said computer electronic tax return information provided electronically to said financial institution to assist said financial institution in:
      (1) allocating said at least said portion of said tax refund to said spending vehicle; and
      (2) issuing to said taxpayer a spending vehicle in an amount greater than said allocated portion according to said taxpayer's selection of said option to receive said spending vehicle.

10. The computerized method of claim 9 further comprising preparing at said computer a tax return for said taxpayer.

11. The computerized method of claim 10 wherein said tax return is prepared by a third party preparer.

12. The computerized method of claim 9 further comprising filing said tax return with a taxing authority.

13. The computerized method of claim 12 further comprising receiving at said computer from said taxing authority assurance that said tax refund amount is forthcoming.

14. The computerized method of claim 12 further comprising receiving from said taxing authority said taxpayer's tax refund.

15. The computerized method of claim 14 further comprising deducting tax return preparation fees from said tax refund when said tax refund is received from said taxing authority.

16. The computerized method of claim 9 wherein said spending vehicle is selected from the group consisting of a debit card, a cash card, a gift card, an e-wallet account, a spending account, a coupon, a discount certificate, and rebate certificate.

17. A computerized system for providing a tax refund to a taxpayer comprising:
   (A) a computer for receiving:
      (1) tax return data comprising a tax refund amount for said taxpayer; and (2) a spending vehicle option selected by said taxpayer, said spending vehicle provided to said taxpayer by a third party that agrees:
 (a) to accept from said taxpayer only a right to receive a deposited tax refund in at least a portion of said tax refund amount;
 (b) to issue said spending vehicle to said taxpayer only in exchange for a right to receive said deposited tax refund; and
 (c) to issue said spending vehicle in an amount greater than said at least said portion of said tax refund amount; and
(B) an assignment from said taxpayer evidencing said right of said third party to receive only a deposited tax refund in exchange for said spending vehicle; and
(C) a third party computer for receiving from said computer electronic tax return information to assist said third party in:
 (1) allocating said at least said portion of said tax refund to said spending vehicle; and
 (2) issuing to said taxpayer a spending vehicle in an amount greater than said allocated portion according to said assignment between taxpayer and said third party.

18. The computerized system of claim 17 wherein said third party is a provider of said spending vehicle.

19. The computerized system of claim 17 wherein said third party is a financial institution that issues said spending vehicle to said taxpayer on behalf of a spending vehicle provider.

20. The computerized system of claim 17 wherein said spending vehicle is selected from the group consisting of a debit card, a cash card, a gift card, an e-wallet account, a spending account, a coupon, a discount certificate, and rebate certificate.

21. The computerized system of claim 17 wherein said tax return data is from a tax return prepared by a tax preparation company.

22. The computerized system of claim 21 wherein said tax preparation company deducts tax return preparation fees from said deposited tax refund.

* * * * *